Figure 1:
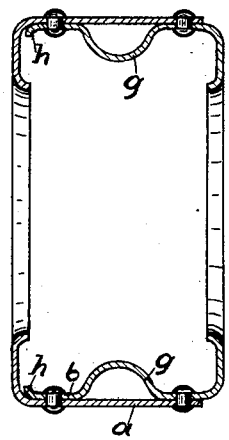

Sept. 27, 1927.

C. DORNIER 1,643,577

HOLLOW LIGHT METAL GIRDER

Filed April 30, 1923

INVENTOR:
Claudius Dornier.

Patented Sept. 27, 1927.

1,643,577

UNITED STATES PATENT OFFICE.

CLAUDIUS DORNIER, OF FRIEDRICHSHAFEN-ON-THE-BODENSEE, GERMANY, ASSIGNOR TO THE FIRM: DORNIER, METALLBAUTEN GESELLSCHAFT MIT BESCHRÄNKTER HAFTUNG, OF FRIEDRICHSHAFEN, GERMANY.

HOLLOW LIGHT-METAL GIRDER.

Application filed April 30, 1923, Serial No. 635,479½, and in Germany August 21, 1922.

My invention relates to hollow light metal beams or girders and more especially to beams or girders formed of two channels combined in such a manner, that their flanges overlap each other and are fixed to one another by suitable means.

It is an object of my invention to provide a beam or girder of this type which is stronger than similar members of equal weight.

In the drawings affixed to this specification several girders embodying my invention are illustrated diagrammatically by way of example. In the drawings Figure 1 is a cross section of one, and Figure 2 is a similar view of another form.

Referring to Figure 1 two channels $a$ and $b$ are combined into a hollow beam in such manner that their flanges overlap each other in pairs. The webs $c$ and $d$ form the side walls of the hollow girder and are provided with circular apertures $e$. The flanges are connected by rows of rivets.

While the flanges of channel $a$ are flat, those of channel $b$ are grooved or corrugated longitudinally at $g$, the grooves or corrugations being covered and closed by the flat flanges of the channel $a$. The rim of each flange of the channel $b$ is turned inwards at $h$.

Figure 2:
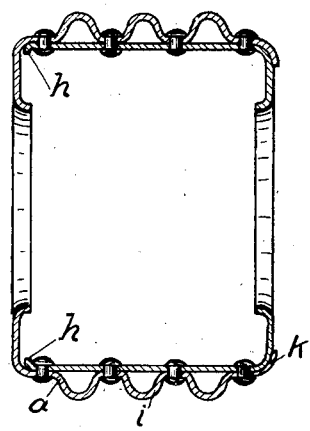

In Figure 2 each flange of channel $a$ has three corrugations $i$ which are covered and closed at the inner side by the flat flanges of channel $b$, adjoining flanges forming a hollow member which is materially stronger than a combination of flat or corrugated flanges of the ordinary type.

I wish it to be understood that I do not desire to be limited with the exact details of construction and configuration, shown and described, for obvious modifications will occur to a person skilled in the art.

I claim:

A structural metallic member comprising two light sheet metal channels combined in such manner that their flanges overlap one another almost entirely, one of two adjoining flanges being corrugated longitudinally, the other one being flat, and means for rigidly connecting the flanges.

In testimony whereof I affix my signature.

CLAUDIUS DORNIER.